United States Patent

Hone et al.

[11] 4,120,067
[45] Oct. 17, 1978

[54] ARTICULATED CLOSURE FOR A PASSENGER LOADING BRIDGE

[75] Inventors: George D. Hone, Roy; Kenneth L. Noall; Robert L. Saunders, both of Ogden, all of Utah

[73] Assignee: Abex Corporation, New York, N.Y.

[21] Appl. No.: 886,975

[22] Filed: Mar. 15, 1978

[51] Int. Cl.² ............................................. B65G 69/24
[52] U.S. Cl. ....................................... 14/71.5; 135/5 R
[58] Field of Search ................. 14/71.5, 69.5; 135/5 R

[56] References Cited

U.S. PATENT DOCUMENTS

| | | | |
|---|---|---|---|
| 3,484,883 | 12/1969 | Van Marle | 14/71.5 |
| 3,588,934 | 6/1971 | Van Marle | 14/71.5 |
| 3,639,934 | 2/1972 | Eggert | 14/71.5 |
| 3,641,604 | 2/1972 | Eggert | 14/71.5 |
| 3,644,952 | 2/1972 | Hatch | 14/71.5 |
| 3,693,204 | 9/1972 | Eggert | 14/71.5 |
| 3,816,867 | 6/1974 | Shirzad | 14/71.5 |

Primary Examiner—Nile C. Byers, Jr.
Attorney, Agent, or Firm—David A. Greenlee; Thomas S. Baker, Jr.

[57] ABSTRACT

A closure for the cab of an aircraft passenger loading bridge comprises a bellows-type curtain frame which includes an outer inverted U-shaped frame having it legs pivoted to the platform for lateral movement and having a pair of power actuator assemblies which are articulated to permit lateral movement of the outer end of the frame to conform to any aircraft contour.

10 Claims, 8 Drawing Figures

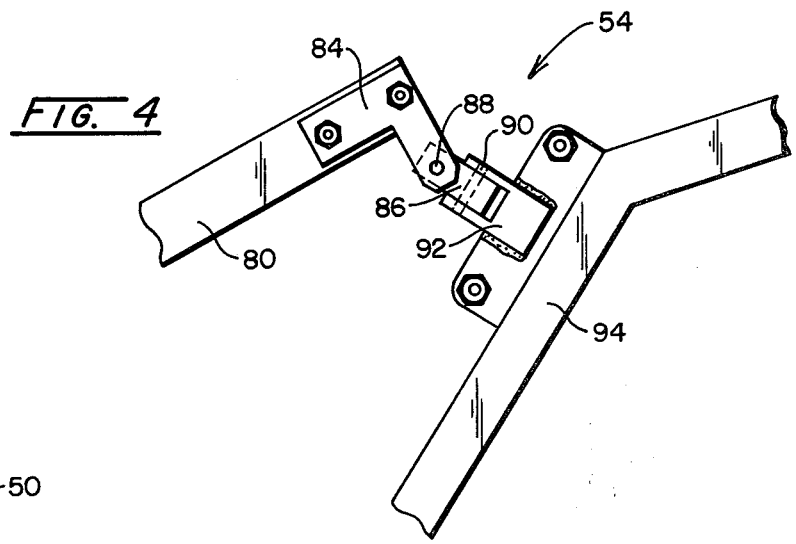
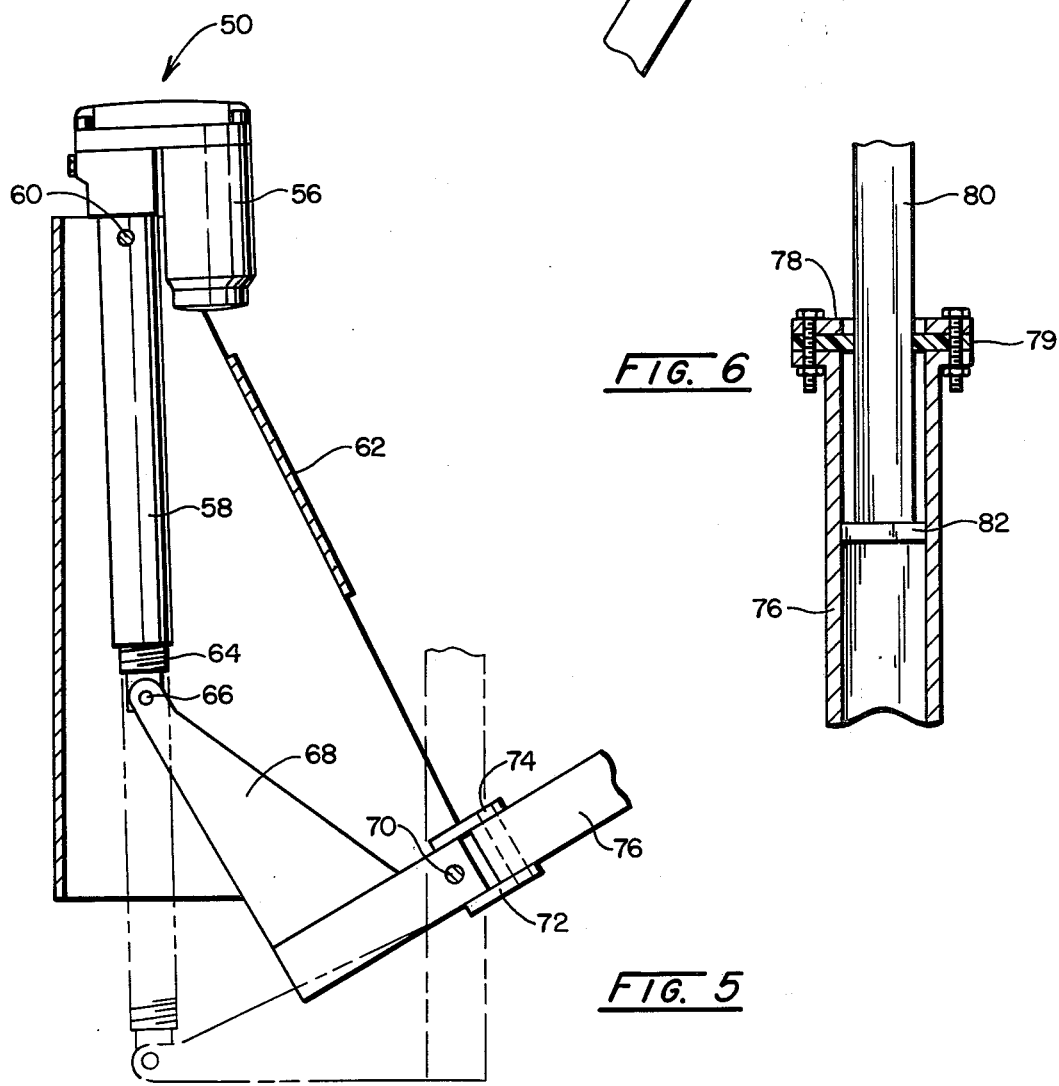
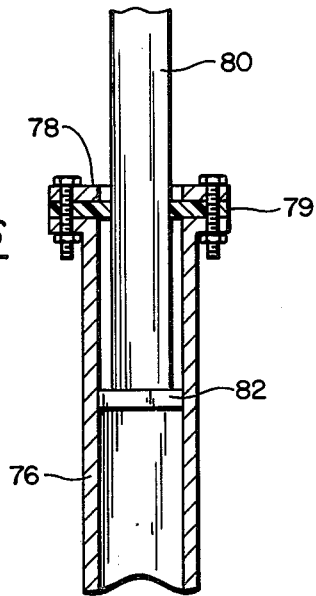

ARTICULATED CLOSURE FOR A PASSENGER LOADING BRIDGE

This invention relates generally to aircraft passenger loading bridges, and more particularly to a closure therefor.

Aircraft passenger loading bridges are provided with end cabs having closures for engaging an aircraft to provide a weather seal during the boarding and disembarking of passengers. These closures are extensible and retractable to generally conform to the contour of the aircraft at the passenger loading door.

Conventional closures normally include a laterally rigid U-shaped curtain frame which has flexible legs pivoted to the platform. This enables pivotal movement of the curtain frame longitudinally to engage and generally conform to the aircraft contour. Heretofore, these closures have been adequate for such aircraft as DC-8, 707, DC-10, 747 and L-1011, in which the contour of that portion of the aircraft engaged by the closure curtain is relatively constant.

With the advent of smaller aircraft, such as DC-9 and 737, the passenger loading door is located very close to the cockpit. Consequently, the contour of that portion of the aircraft engaged by the closure changes quite rapidly from passenger compartment to cockpit windows. It has been found that the conventional closures are not sufficiently flexible to completely seal against this aircraft contour.

This invention provides an articulated closure which provides increased flexibility for superior sealing against aircraft of all types. This increased flexibility is attained by providing a compound motion of the closure curtain frame which includes lateral as well as longitudinal movement.

A better understanding of this invention will be gained by reference to the following detailed description in conjunction with the attached drawings, wherein:

FIG. 4 is an enlarged detail view illustrating the articulated actuator arm connection to the outer frame;

FIG. 5 is an enlarged detail view of the inner portion of the actuator assembly;

FIG. 6 is an enlarged, partial sectional view of the juncture of the actuator inner and outer arms;

Figure 1:
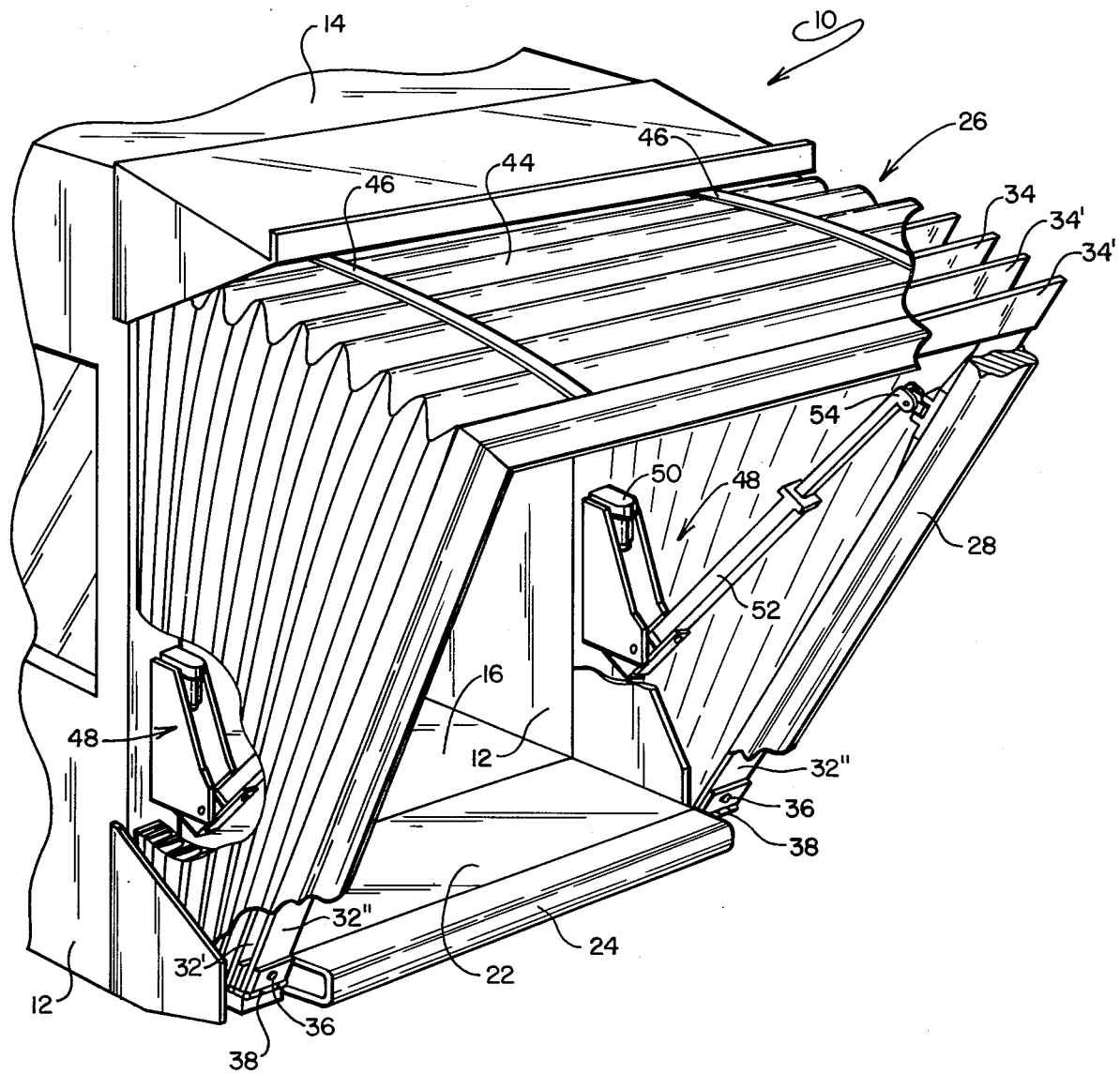
FIG. 1 is a perspective view of the closure according to this invention.
Figure 2:
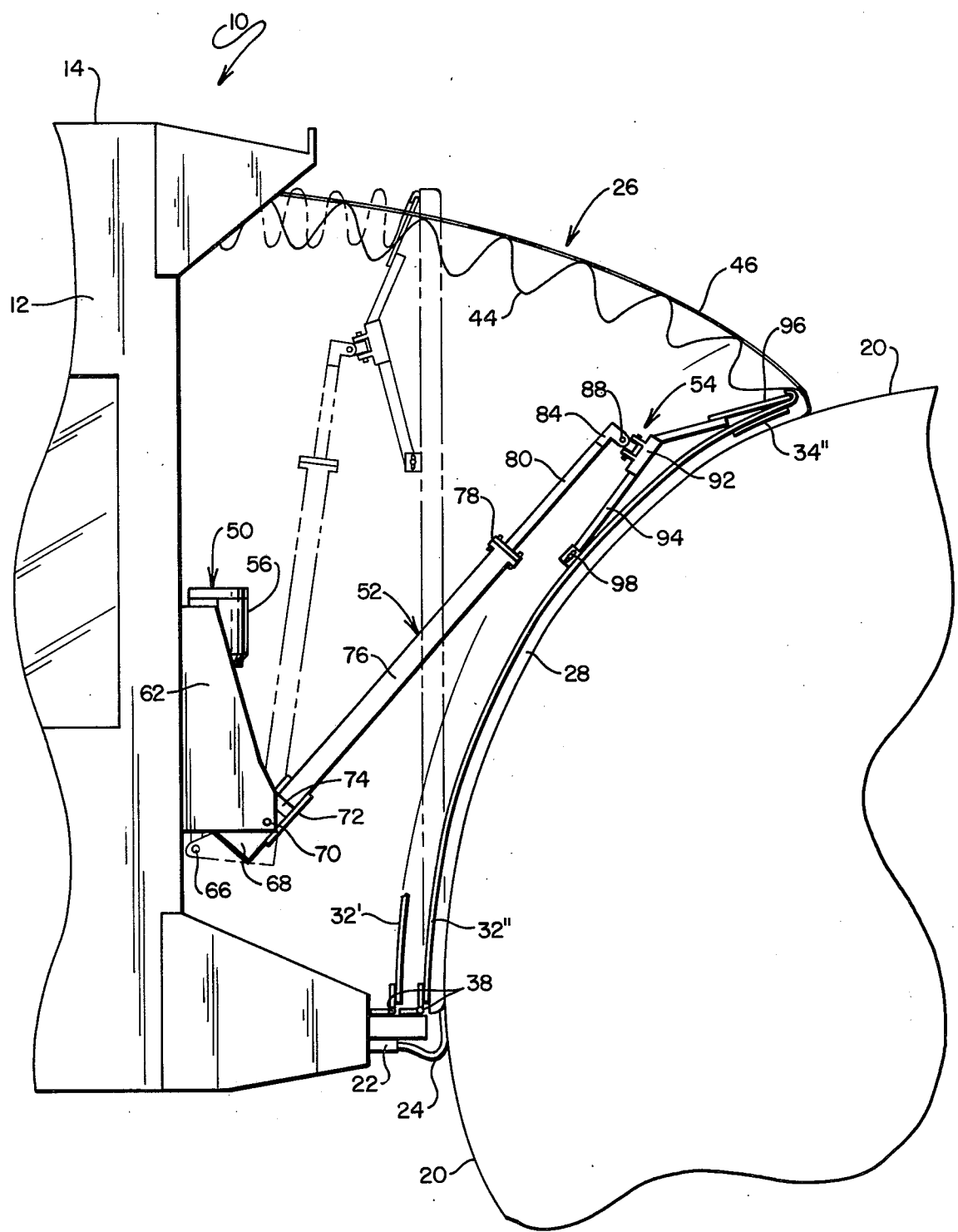
FIG. 2 is a side view of the closure frame and its power actuator assembly.
Figure 3:
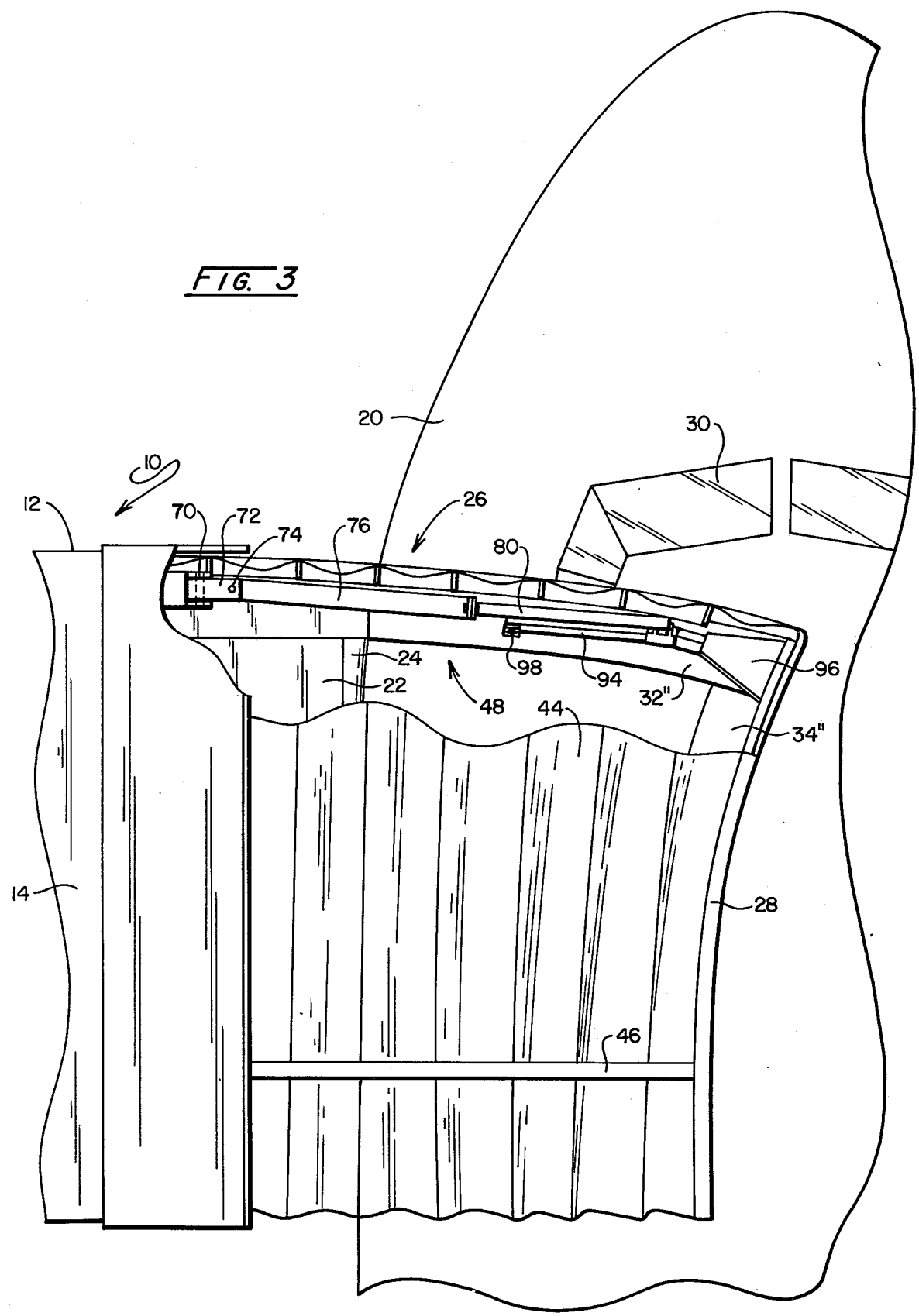
FIG. 3 is a partial plan view of the closure, broken away to illustrate lateral movement capability of the actuator assembly.

Referring to FIGS. 1-3 of the drawings, an aircraft passenger loading bridge of any conventional construction (not shown) includes an end cab 10 having a passenger walkway defined by side walls 12, a roof 14 and a floor 16. The cab 10 terminates in a closure for engaging an aircraft 20. The closure includes a platform 22 which mounts an aircraft engaging bumper 24 and a closure assembly 26 that mounts a peripheral pad 28 which, in conjunction with bumper 24, provides a weather seal against the aircraft 20 about a passenger loading door (not shown), which is located adjacent the aircraft cockpit 30.

Figure 7:
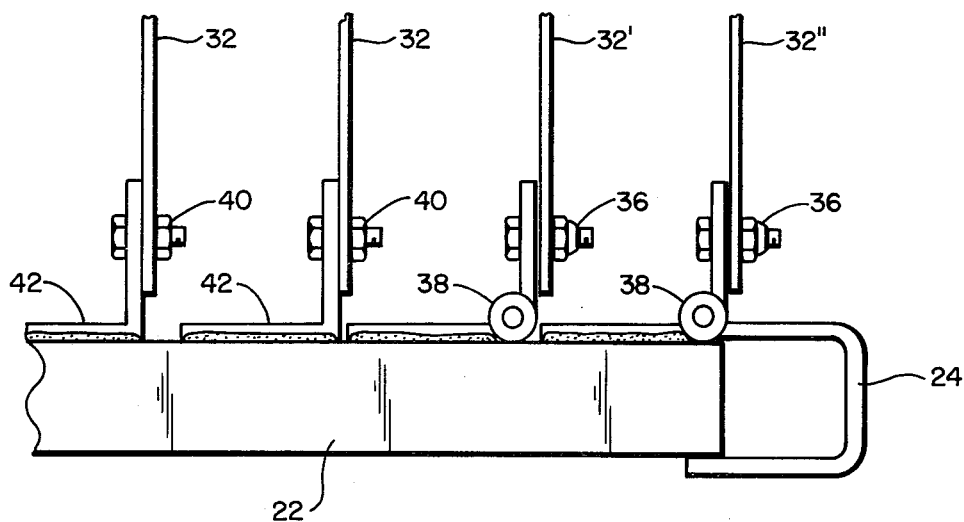
FIG. 7 is an enlarged detail side view of the pivotal connection of the frame uprights to the closure platform.

The closure assembly 26 includes a supporting frame which comprises a plurality of longitudinally spaced pairs of flexible uprights 32, 32', 32" that are mounted on their lower ends to platform 22, as best seen in FIGS. 2 and 7. The uprights 32, 32', 32" are connected by upper flexible transverse members 34, 34', 34". The frame structure is similar to, and an improvement on, the frame shown in U.S. Pat. No. 3,644,952, issued to Gerald S. Hatch on Feb. 29, 1972. As shown in FIG. 7, the outer two pairs of flexible frame uprights 32', 32" are attached by pivot bolts 36 to hinges 38 which are mounted on platform 22. The remaining inner pairs of uprights 32 have their lower ends rigidly mounted by pairs of bolts 40 to brackets 42 which are mounted on platform 22. Outermost upright 32" and transverse member 34" mount peripheral pad 28. A flexible bellows-type curtain 44 is attached to the uprights 32, 32', 32" and transverse members 34, 34', 34".

The flexibility of frame uprights 32', 32" in conjunction with hinges 38 permits sufficient outward movement of transverse member 34" to conform pad 28 to the contour of aircraft 20. The flexibility of rigidly mounted uprights 32 is sufficient to uniformly extend the top curtain 44.

Figure 8:
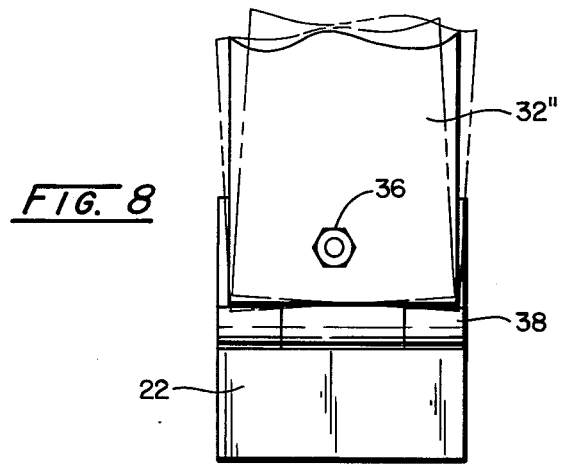
FIG. 8 is an enlarged detail front view of the pivotal connections shown in FIG. 7.

Curtain 44 includes top mounted restraining straps 46 which prevent overstressing of the curtain when closure assembly 26 is fully extended (see FIGS. 1 and 2). Pivot bolts 36 permit lateral movement of frame uprights 32', 32", as shown in FIG. 8.

Referring now to FIGS. 1 and 2, the closure is provided with drive means comprising a pair of identical right and left (viewed facing the aircraft) sidemounted actuator assemblies. The actuator assemblies each include a power actuator assembly 50, an extensible arm assembly 52 and a frame connection assembly 54. As illustrated in FIG. 5, the power actuator assembly 50 includes an electric motor 56 which drives a conventional extensible ball screw actuator 58 which has a pivotal connection 60 to a mounting bracket 62 rigidly attached to the cab side wall 12. The extensible screw 64 of the ball screw actuator 58 has a pivotal connection 66 to a bell crank 68 that is pivoted at 70 to bracket 62. Bell crank 68 mounts a link 72 which is pivoted at 74 to the lower inward arm 76 of extensible arm assembly 52, as best seen in FIG. 5. Bell crank 68 and pivots 66 and 70 together comprise the pivot means connecting the screws 64 of power actuators 50 to the respective inward arms 76 of arm assemblies 52. Pivots 70 and 74 permit respective vertical and lateral movement of arm assembly 52.

As shown in FIGS. 1, 2 and 6, lower arm 76 is a box section which, at its outer end, has an apertured end cap 78 and bearing 79 that are bolted to arm 76. The lower arm slidably receives an upper outward arm 80 that inclues an inner guide 82, which cooperates with end cap 78 to guide extension and retraction of arm 80 relative to arm 76.

As best seen in FIGS. 2 and 4, arm 80 has a bracket 84 bolted to its outer end. A link 86 is pivoted at 88 to bracket 84 and is perpendicularly pivoted at 90 to a bracket 92 of a frame attachment member 94 which is rigidly connected at 96 and has a pin-and-slot connection 98 to frame upright 32". The link 86 and mutually perpendicular pivots 88 and 90 form a universal joint or connection which permits universal movement of the upper end of frame upright 32" relative to arm 80.

Operation of the closure to engage aircraft 20 will now be described, with reference to FIGS. 1, 2, 3 and 5. Cab 10 is conventionally moved to engage bumper 24 with aircraft 20. Beginning with the closure assembly in its retracted dashed-line position of FIGS. 2 and 5, each of the electric motors 56 is then energized to retract its screw 64 and pivot each bell crank 68 clockwise about pivot 70, as shown in FIG. 5. This moves arm assemblies 52 clockwise to progressively engage pad 28 with aircraft 20, causing upper arms 80 to extend relative to lower arm 52 until the right (viewed facing the aircraft) upright 32" has completely engaged the aircraft. At this point, the right electric motor 56 is deactivated and the left motor 56 will continue to extend the upper end of upright 32" until it engages aircraft 20, as shown in FIG. 3.

Since the forward end of transverse member 34" is forced by the changing contour of the aircraft to bend around cockpit 30, this end must also move to the right (rearwardly of the aircraft) since it is of finite length. Such movement is permitted by the flexible joint 86, 88, 90, while required lateral movement of arm assembly 52 is accommodated by inner pivot 74. Since transverse members 34', 34" are rigidly attached to the upper end of uprights 32', 32", the uprights are also forced to move laterally, such movement being permitted by lower pivot bolts 36, as shown in FIG. 8. Such lateral movement of the uprights is preferably limited to the outermost uprights, while the remainder are rigidly mounted to platform 22 to provide lateral stability for the curtain frame. Of course, design parameters may dictate that only one, three, or perhaps more, of the uprights have this feature. In any event, a majority of the uprights should be rigidly mounted for the sake of stability.

It thus can be seen that the closure assembly of this invention, through the articulation provided for its frame and actuator assembly, premits the pad 28 and its mounting frame members 32" and 34" to conform to any aircraft contour. It is, of course, recognized that other types of actuators, such as hydraulic, can be utilized, while different types of universal connections and modes of pivoting are contemplated. It is possible that only one power actuator assembly 50 may be required either on the left (forward) side or centrally of the closure. It may also be possible to eliminate the articulation features of the right (rearward) actuator assembly 50, since it is normally not necessary for most left-side-of-aircraft loading operations.

While only a preferred embodiment of this invention is illustrated, the above and similar minor modifications are contemplated within the scope of this invention as defined by the following claims.

We claim:

1. A closure for a cab which connects a passenger loading bridge to an aircraft, the closure having a platform, a flexible frame including a pair of flexible spaced uprights interconnected at their upper ends by a flexible transverse member, a curtain connecting the frame to the cab, and drive means for moving the frame toward and away from the cab, characterized by:
    fist pivot means pivoting the lower ends of the frame uprights to the platform to enable lateral swinging movement and
    the drive means including
    an extensible arm assembly comprising inward and outward arms;
    second pivot means pivoting the inward arm to the cab to enable vertical and lateral movement,
    a flexible joint connecting the outward arm to the frame and
    a power actuator connected to the inward arm for vertically swinging the arm assembly to move the frame toward and away from the cab.

2. The closure of claim 1, further characterized by the power actuator comprising a motor-driven ball screw actuator pivotally mounted to the cab and having an extensible end connected by the second pivot means to the inward arm.

3. The closure of claim 1, further characterized by the flexible joint being a mechanical joint.

4. The closure of claim 1, further characterized by means for limiting movement of the frame away from the cab.

5. The closure of claim 1, further characterized by the second pivot means being located at one side of the cab and the flexible joint being located at the one side of the frame, the drive means including a second extensible arm assembly comprising second inward and outward arms pivotally interconnecting the other side of the cab with the other side of the frame.

6. The closure of claim 5, further characterized by the drive means including:
    third pivot means pivoting the second inward arm to the other side of the cab to enable vertical and lateral swinging movement and
    a second flexible joint connecting the second outward arm to the other side of the frame.

7. The closure of claim 6, further characterized by the drive means including a second power actuator connected to the second inward arm to vertically swing the second arm assembly and move the frame toward and away from the cab.

8. The closure of claim 7, further characterized by both power actuators comprising motor-driven ball screw actuators mounted to the cab and having extensible ends connected by the respective second and third pivot means to the respective inward arms.

9. The closure of claim 8, further characterized by the flexible joints being mechanical universal joints.

10. The closure of claim 9, further characterized by the flexible frame including a plurality of longitudinally-spaced pairs of flexible uprights, each pair interconnected at their upper ends by flexible transverse members, an outer minority of said uprights having means pivoting their lower ends to the platform to enable lateral swinging movement and an inner majority of said uprights having their lower ends rigidly attached to said platform.

* * * * *